United States Patent [19]
Rounds

[11] Patent Number: 6,037,900
[45] Date of Patent: Mar. 14, 2000

[54] GPS RECEIVER WITH EXTENDED SECURITY

[75] Inventor: Steve Rounds, Irvine, Calif.

[73] Assignee: Software Technology & Systems, Inc., Los Angeles, Calif.

[21] Appl. No.: 09/124,931

[22] Filed: Jul. 29, 1998

Related U.S. Application Data

[60] Provisional application No. 60/065,898, Nov. 17, 1997.

[51] Int. Cl.$^7$ .............................. H04B 7/185; G01S 5/02
[52] U.S. Cl. .............................. 342/357.06; 342/357.12; 701/214
[58] Field of Search ........................ 342/357.06, 357.12; 701/214, 216

[56] References Cited

U.S. PATENT DOCUMENTS 5,903,654  5/1999  Milton et al. ............................ 342/352

Primary Examiner—Theodore M. Blum
Attorney, Agent, or Firm—Fulwider Patton Lee & Utecht, LLP

[57] ABSTRACT

A spread spectrum receiver uses a SAASM module to provide a non-secure point position solution from signals received from GPS satellites. The point position solution is converted to a set of synthetic satellite position and range information by synthesizing a set of satellite position and range data that would have produced the same point position solution from a hypothetical set of satellites in a predetermined constellation, such as four satellites at right angles to each other. The synthetic satellite position and range information preserves the navigation information produced by the SAASM receiver without compromising the security of the protected data.

13 Claims, 1 Drawing Sheet

GPS RECEIVER WITH EXTENDED SECURITY

CROSS REFERENCE TO RELATED APPLICATION(S)

This application claims the priority of U.S. Provisional Patent Application Ser. No. 60/065,898, filed Nov. 17, 1997.

BACKGROUND OF THE INVENTION

1. Field of the Invention

This invention relates to Global Positioning System or GPS receivers.

2. Description of the Prior Art

GPS systems were originally developed to provide position information and navigation data for the military. Military uses require that the full accuracy of the provided data not be easily available to opposing forces. Many techniques have been incorporated into the GPS system for limiting access to the information including the use of spread spectrum transmissions, multiple levels of pseudorandom modulation encoding and Selective Availability (SA) techniques.

Non-military GPS systems have been widely accepted and used. Non-military, or more generally, unauthorized users do not have access to the full capabilities of the GPS system. Access is granted to authorized users by distribution of a GPS 'key' or cryptovariable. Only access to this key allows the authorized user to have access to the classified satellite position and range information. The GPS position, when formed as a point solution from the classified satellite position and range information, is unclassified, and can be provided as the unclassified receiver output. This can allow a military GPS receiver to remain unclassified when keyed. Of concern to the military, however, is how to limit access to the classified data when a GPS receiver which has been loaded with a GPS 'key' falls into the hands of an unauthorized user.

One proposed technique for protecting the secure information is the proposed Selective Availability Anti-Spoofing Module, or SAASM-based receiver. The specification for SAASM is SS-GPS-001, Global Positioning System (GPS) Selective Availability Anti-Spoofing Module (SAASM) System Specification, dated Dec. 5, 1994. The unclassified SAASM receiver maintains all secure information internally and provides only unclassified outputs, including the permitted point solution information. One expected difficulty with such security systems is that other user equipment, such as inertial navigation systems and the like, are designed to utilize the satellite position and range information.

The purpose of the SAASM configuration is to limit the availability of GPS-classified data outside of the tamper-resistant security module. Certain user equipment, such as tightly coupled GPS-Inertial integration requires the corrected pseudorange and delta-range observations, which are classified. Various alternatives have been proposed to accommodate these conflicting requirements, including incorporation of the integration filter inside the SAASM (which greatly increases the complexity of the SAASM), use of a Position/Velocity/Time solution in the integration filter (which eliminates the widely recognized advantages of tight coupling) and development of a classified SAASM which outputs classified pseudorange and delta-range (which is antithetical to the concept of SAASM).

What is needed is a technique for using secure receiver systems such as unclassified SAASM receivers with user equipment requiring satellite position and range information without defeating the security provisions of the SAASM receivers.

It should be noted that the identification of classified vs. unclassified data made within this application represents the best understanding of the author at the time its writing. The sole authority for classification determination for GPS data is the GPS Joint Program Office, and such determinations are subject to interpretation and change.

SUMMARY OF THE INVENTION

It is a primary object of the present invention to provide method and apparatus for using the GPS system to maintain the required security, in accordance with the GPS Security Classification Guide, dated Aug. 25, 1993, for the secured information while providing the satellite position and range information required for use by various user systems such as inertial navigation devices.

In particular, it is a primary object of the present invention to provide for the creation of full accuracy, unclassified, GPS-like measurement data suitable for external tightly coupled implementations in a SAASM application.

These and other objects, features and advantages are provided by the present invention which, in a first aspect, provides unclassified measurements in a form similar to pseudoranges and deltaranges which contain all of the navigation information of the classified data, and is suitable for use in a tightly coupled integration filter external to the SAASM.

In another aspect, the present invention provides a system in which non-secure position data, such as a point source solution, developed from an unclassified GPS receiver, such as a SAASM-based receiver, is converted into synthetic satellite range and position information. The synthetic satellite range and position information provides the known, non-secure position information without compromising any of the secured data, such as actual satellite position and range information, access to modulation codes and the like.

In another aspect, the present invention provides a secure navigation receiver including a SAASM module for providing a GPS based point source solution, means for converting the point source position solution into synthetic satellite position and range information and a user navigation device, such as a inertial navigation system for utilizing the synthetic satellite position and range information to provide required user activity, such as an update navigation or position solution.

In another aspect, the present invention provides a method for converting secured satellite position and range information into non-secured synthetic satellite position and range information by generating a point position solution from the secured information and converting the point position information into synthetic satellite position and range information for use by other user equipment.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWING(S)

FIG. 1 is an overview illustration of the operation of a secure GPS receiver system according to the present invention.

DETAILED DESCRIPTION OF THE PREFERRED EMBODIMENT(S)

Figure 1:
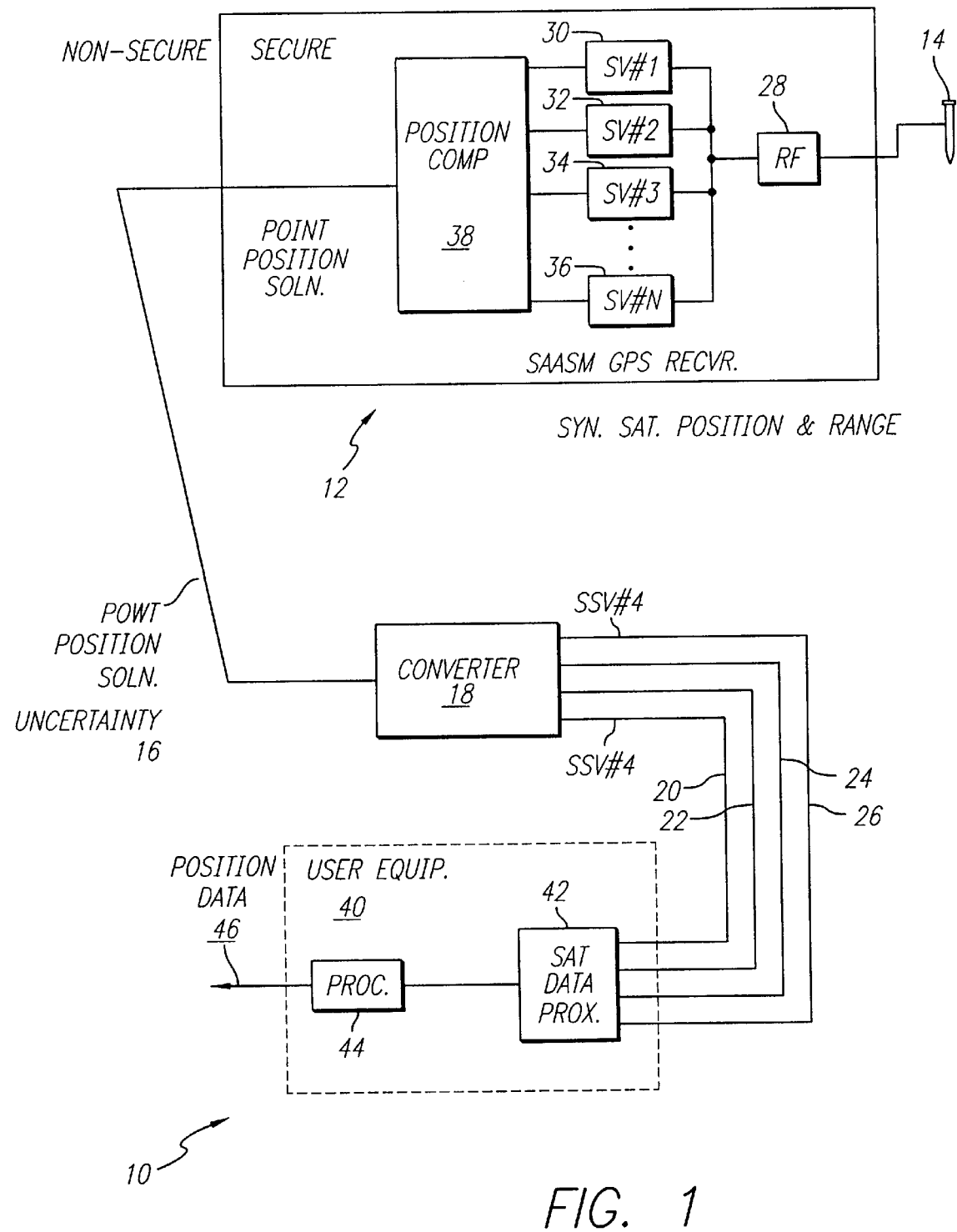

FIG. 1 is an overview illustration of the operation of secure GPS receiver system 10 according to the present invention in which SAASM GPS Receiver 12 processes signals received from satellites via antenna 14 to produce point position solution 16. The signals and data within SAASM GPS Receiver 12 may be secure while point position solution 16 may be non-secured data.

SAASM GPS Receiver 12 may be of any convenient configuration suitable for protecting the data to be secured and may in particular be a receiver configured in accordance with the SAASM specification. A generally conventional GPS receiver would include an RF processing section 28, responsive to signals received from satellites by antenna 14, to apply signals to multiple satellite tracking channels, such as satellite tracking channels 30, 32, 34 and 36 each of which tracks signals from actual satellites using secured data including modulation codes and satellite position information. The satellite tracking channels typically provide range and satellite position information to a processing unit, such as Position Computation 38, which produces point position solution 16 by determining what position on earth would have those ranges to satellites in those positions, by for example, providing a least squares solution.

Point position solution 16 is applied to Converter 18 which processes point position solution 16 to produce a plurality of synthetic satellite data such as synthetic satellite position and range information 20, 22, 24 and 26 for synthetic satellites SSV#1, SSV#2, SSV#3 and SSV#4.

The synthetic satellite position and range information is unclassified data which carries all the navigation information and accuracy inherent in the processing provided by SAASM GPS Receiver 12 but does not compromise the security of the satellite position, codes or other data secured within SAASM GPS Receiver 12.

The synthetic satellite position and range information from Converter 18 is applied to user equipment 40 which may for example be an inertial navigation system or other equipment typically tightly coupled to the GPS receiver and therefore to be used with satellite position and range information. For convenience in the following description, user equipment 40 is shown to have Satellite Data Processing Unit 42 which receives the synthetic satellite position and range information from Converter 18 as its inputs. The output of Satellite Data Processing Unit 42 may then be further processed by User Processor 44 to produce position data 46 or other required data and/or display and control signals.

It is important to note that although secured data and information, such as satellite position and pseudoranges, may be available within SAASM GPS Receiver 12, such secured data is not available external to the receiver, having been recast as unclassified data, by the processing of point position solution 16.

In operation, a point solution is formed in SAASM GPS Receiver 12 using all available pseudorange measurements and associated satellite positions. The measurement and satellite data have been corrected for the effects of Selective Availability or SA, resulting in an unfiltered, full accuracy navigation solution such as point position solution 16.

A set of four synthetic satellite measurements and observations are then created from these unclassified data, such as synthetic satellite position and range information 20, 22, 24 and 26. Careful choice of the location of these synthetic satellites allows the resultant synthetic data set to contain all of the information of the original, classified, data.

Converter 18 operates by replacing the four or more original satellites with four synthetic satellites which are mutually perpendicular in 4-space. The four directions are chosen along the eigenvectors of the uncertainty ellipse created in computing the point solution from the original satellites. Converter 18 therefore converts the point solution and uncertainty ellipse into four synthetic satellite positions and ranges and four associated measurement uncertainties.

In particular, associated with the unfiltered navigation solution of point position solution 16 is an uncertainty ellipse, which reflects the geometry of the original satellite constellation. This is typically represented as $(H^T H)^{-1}$, where H is the 4×n observation sensitivity matrix, n is the number of satellites (>4) and the assumption has been made that observation noise is equal for each satellite. Solving for the four eigenvectors of this matrix gives four mutually perpendicular directions in 4-space along which the navigation solution uncertainties are uncorrelated. The corresponding four eigenvalues provide the relative uncertainty in each of these directions.

These four measurement sets 20, 22, 24 and 26 together with the corresponding eigenvalues provide the data to replace the classified pseudorange, satellite position and measurement uncertainty. Since these data were computed strictly from unclassified data (the navigation point solution 16), they must themselves be considered unclassified or non-secured data.

A typical implementation of this is presented in the equations below. Equation (1) relates the measured, classified pseudorange of a single satellite ($PR_i$) to the satellite position ($X_{SVi}$), user position ($X_{user}(0)$) and the time error (b(0)). A common technique is to linearize this equation using an initial estimate of the user position and time to get the approximation of Equation (2). This equation relates the error in pseudorange ($\epsilon PR_1$) with the error in user position ($\epsilon X_{user}$) and the error in the time estimate ($\epsilon b$) by the observation sensitivity matrix, $H_i$. Equation (3) extends Equation (2) by forming a matrix equation for N satellites (N≧4) using the N×4 matrix, H.

$$PR_j = \left| \vec{X}_{SVj} - \vec{X}_{USER}(0) \right| + b(0) \qquad (1)$$

$$\varepsilon PR_j \approx H_j \begin{bmatrix} \varepsilon \vec{X}_{USER} \\ \varepsilon b \end{bmatrix} \qquad (2)$$

$$\begin{bmatrix} \varepsilon PR_1 \\ \varepsilon PR_2 \\ \vdots \\ \varepsilon PR_N \end{bmatrix} = H \begin{bmatrix} \varepsilon \vec{X}_{USER} \\ \varepsilon b \end{bmatrix} \qquad (3)$$

Under most physically realistic conditions, Equation (4) represents the least squares error solution to Equation (3), where it has been assumed that the errors on each satellite are random, uncorrelated, and equal. With these assumptions, the uncertainty in the estimate of the error in user position is given by Equation (5), where σ is the uncertainty in any single satellite measurement.

$$\varepsilon \vec{X}_{USER} = (H^T H)^{-1} H^T \begin{bmatrix} \varepsilon PR_1 \\ \varepsilon PR_2 \\ \vdots \\ \varepsilon PR_N \end{bmatrix} \qquad (4)$$

$$E\left( \varepsilon \vec{X}_{USER} \varepsilon \vec{X}^T_{USER} \right) = \sigma^2 (H^T H)^{-1} \qquad (5)$$

One of the features of the invention described herein is to reform the covariance of Equation (5) into its component eigenvectors and eigenvalues, as presented in Equation (6). The rows of H' represent the four eigenvectors of this equation and the four values of $(\sigma')^2$ represent the eigenvalues. With this identification, it is another feature of this invention that the synthetic pseudoranges, $SPR_i$ (i=1,4) can be computed according to Equation (7), with $\sigma'$ representing the uncertainty in this estimate. In using these estimate, the matrix H' which contains the eigenvectors is used to replace the matrix H which was formed from the true satellite positions. In this sense, the rows the matrix H' represent the directions in 4-space of the four synthetic satellites just as the rows of H represent the corresponding directions in space of the N true satellites.

$$\sigma^2(H^T H)^{-1} = H' \begin{bmatrix} \sigma_1'^2 & 0 & 0 & 0 \\ 0 & \sigma_2'^2 & 0 & 0 \\ 0 & 0 & \sigma_3'^2 & 0 \\ 0 & 0 & 0 & \sigma_4'^2 \end{bmatrix} H'^T \quad (6)$$

$$SPR_j \approx H'_j \begin{bmatrix} \vec{X}_{USER}(0) + \varepsilon \vec{X}_{USER} \\ b(0) + \varepsilon b \end{bmatrix} \quad (7)$$

Using the original, classified data, the user employing a tightly coupled implementation of a Kalman filter would use the system of equations found in Equation (8). It is one of the features of this invention that the user of the synthetic observations can use the exactly analogous equations found in Equation (9). If is further one of the further features of this invention that the results using either Equation (8) or (9) are mathematically identical.

$z_1 = PR_1 - H\vec{X}_{USER}$ $K = PH^T(HPH^T + R)^{-1}$ $\vec{X}^+_{USER} = \vec{X}^-_{USER} + Kz_1$ $P^+ = (I - KH)P^-$ \quad (8)

$z_1 = SPR_i - H'\vec{X}_{USER}$ $K = PH'^T(H'PH'^T + \sigma_1'^2)^{-1}$ $\vec{X}^+_{USER} = \vec{X}^-_{USER} + Kz_i$ $P^+ = (I - KH')P^-$ \quad (9)

It is one of the features of this invention that exactly analogous techniques allow the creation of unclassified synthetic deltaranges to each of four synthetic satellite locations from the original classified deltaranges. In fact, if the same satellites are used for the deltarange computation as for the pseudorange computation, the eigenvectors will be identical.

It is one of the features of this invention that straightforward extensions allow processing unequal measurement uncertainties for the original satellite measurements. For such applications, the matrix $(H^T H)^{-1} H^T$ found in Equation (4) et seq., would be replaced with $(H^T W^{-1} H)^{-1} H^T W^{-1}$ where W represents the desired weighting matrix.

It is one of the features of this invention that straightforward extensions allow the use of the unclassified synthetic measurements even if less than four satellite measurements are available. A possible implementation of this is described in the equations below. Assuming three satellite measurements are available, a fourth satellite measurement is generated in a direction which is perpendicular to the other three satellites. This is expressed in Equation (10), which allows defines the fourth row of the matrix H in terms of the other three rows. Equation (11) allows the creation of a pseudo-range measurement corresponding to this direction. With this addition, there exist four satellite measurements and the techniques above can be used to create the four synthetic satellite measurements. One of the four synthetic satellites will have an eigenvector (a row of the H' matrix) which is parallel to $H_4$. This synthetic satellite is discarded, as it does not correspond to one of the three original independent measurements. This leaves three unclassified synthetic measurements which represent an unclassified version of the information contained in the three original classified satellite measurements.

$H_4 \cdot H_1 = 0$ \quad (10)

$H_4 \cdot H_2 = 0$ $H_4 \cdot H_3 = 0$ $H_4(4) = 1$ $$PR_4 = H_4 \begin{bmatrix} \varepsilon \vec{X}_{USER}(0) \\ \varepsilon b(0) \end{bmatrix} \quad (11)$$

This feature of the invention can also be used to develop synthetic outputs when only two measurements are available. The equations of Equation (12) can be used to generate a (non-unique) third measurement. With this measurement, the equations of Equations (10) and (11) are used to form the fourth measurement. On completion of the generation of the synthetic measurements following the techniques described above, the two synthetic satellites parallel to $H_3$ and $H_4$ are discarded, leaving two synthetic satellites corresponding to the two original satellite measurements.

$H_3 \cdot H_1 = 0$ \quad (12)

$H_3 \cdot H_2 = 0$ $H_3(4) = 1$ $$PR_3 = H_3 \begin{bmatrix} \varepsilon \vec{X}_{USER}(0) \\ \varepsilon b(0) \end{bmatrix}$$

It is also a feature of this invention that when less than four satellites are available, alternate data may be used to create the measurements required to form a set of four measurements required by Equation (4). Examples of alternate data sources commonly used to provide such measurements are externally supplied altitude and/or clock estimates.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention.

What is claimed is:

1. A SAASM-based GPS receiver for use with equipment requiring unclassified satellite data, comprising:
    a SAASM-based module for producing an unclassified point solution from classified measurements derived from signals received from GPS satellites; and
    means for converting the unclassified navigation point solution into unclassified data related to synthetic satellites.

2. The GPS receiver of claim 1,
wherein the SAASM-based module produces unclassified position information from classified pseudorange measurements derived from GPS satellites; and
wherein the means for converting further comprises:
means for converting the unclassified position information into unclassified pseudorange data related to synthetic satellites.

3. The GPS receiver of claim 1,
wherein the SAASM-based module produces unclassified velocity information from classified deltarange measurements derived from GPS satellites; and
wherein the means for converting further comprises:
means for converting the unclassified velocity information into unclassified deltarange data related to synthetic satellites.

4. The GPS receiver of claim 1, further comprising:
hold means responsive to the SAASM module for producing the unclassified point solution from classified measurements derived from signals received from less than four GPS satellites.

5. The GPS receiver of claim 4, wherein the hold means further comprises:
means for estimating any combination of altitude, clock and cross-track hold data.

6. The GPS receiver of claim 1, further comprising:
means responsive to the unclassified data for further processing the data for navigation purposes.

7. The GPS receiver of claim 1, wherein the means for converting the unclassified point solution into unclassified data related to synthetic satellites further comprises:
means for producing synthetic satellite information which does not include secured data including actual satellite data and access to modulation codes.

8. The GPS receiver of claim 7, wherein the means for producing synthetic satellite information further comprises:
means for synthesizing data from four synthetic satellites which are mutually perpendicular in 4-space.

9. The GPS receiver of claim 8, wherein the means for synthesizing data from four synthetic satellites further comprises:
means for equalizing observation noise between the four satellites.

10. The GPS receiver of claim 8, wherein the means for synthesizing data from four synthetic satellites further comprises:
means for selecting four synthetic satellites, which are mutually perpendicular in 4-space, along directions chosen along the eigenvectors of an uncertainty ellipse created in computing the unclassified point solution.

11. The GPS receiver of claim 8, wherein the means for synthesizing data from four synthetic satellites further comprises:
means for selecting four synthetic satellites, which are mutually perpendicular in 4-space, along directions along which the navigation uncertainties are uncorrelated.

12. The method of providing unclassified satellite information to equipment requiring such information based on unclassified point solution data derived from classified measurements of signals received from GPS satellites, comprising the steps of:
selecting synthetic satellites at positions corresponding to the unclassified point solution data, said synthetic satellites being mutually perpendicular in 4-space along directions along which the navigation uncertainties are uncorrelated; and
deriving the unclassified satellite information from the synthetic satellites.

13. The method of claim 12 wherein the step of deriving unclassified satellite information from the synthetic satellites further comprises the step of:
deriving satellite pseudorange or deltarange from the synthetic satellites.

\* \* \* \* \*